US011894156B1

(12) United States Patent
Moseev et al.

(10) Patent No.: US 11,894,156 B1
(45) Date of Patent: Feb. 6, 2024

(54) SEPARATION OF RARE EARTH ELEMENTS BY MEANS OF PHYSICAL CHEMISTRY FOR USE IN MEDICAL APPLICATIONS

(71) Applicant: CVF International LLC, New York, NY (US)

(72) Inventors: Pavel Moseev, Moscow (RU); Aleksandr Klachkov, Moscow Oblast (RU); Roman Tertychnyy, Moscow Oblast (RU); Aleksandr Khasin, Kfar Saba (IL)

(73) Assignee: CVF International LLC, New York, NY (US)

( * ) Notice: Subject to any disclaimer, the term of this patent is extended or adjusted under 35 U.S.C. 154(b) by 0 days.

(21) Appl. No.: 18/130,461

(22) Filed: Apr. 4, 2023

(51) Int. Cl.
*G21G 1/00* (2006.01)
*G21G 1/06* (2006.01)

(52) U.S. Cl.
CPC ....... *G21G 1/06* (2013.01); *G21G 2001/0094* (2013.01)

(58) Field of Classification Search
CPC ........... G21G 1/001; G21G 2001/0094; G21G 2001/02; G21G 2001/06; G21G 2001/08; G21K 5/08
See application file for complete search history.

(56) References Cited

U.S. PATENT DOCUMENTS

2013/0070883 A1* 3/2013 Teleki ...................... G21G 1/06 376/158
2013/0083882 A1* 4/2013 Ehst ......................... H05H 6/00 376/202
2014/0294700 A1* 10/2014 Marx ...................... A61P 35/00 423/2

(Continued)

FOREIGN PATENT DOCUMENTS

RU 2704005 10/2019
WO WO 2019/106182 6/2019

(Continued)

OTHER PUBLICATIONS

Karl A. Gschneidner, Jr.; The Application of Vacuum Metallurgy in the Purification of Rare-Earth Metals; Department of Metallurgy and Institute for Atomic Research Iowa State University; For Oral Presentation at Eighth Annual Conference on Vacuum Metallurgy, New York, New York; Jun. 21-3, 1965.

*Primary Examiner* — Sharon M Davis
(74) *Attorney, Agent, or Firm* — PEARL COHEN ZEDEK LATZER BARATZ LLP

(57) ABSTRACT

Methods and systems are provided for cyclical enrichment, especially of rare earth elements and isotopes. A tube, or ampule, with two coaxially opposite crucibles in fluid communication, is used to hold a source material in vacuum and irradiate the source material to enrich it with product material. Following the irradiation of the source substance (e.g., Yb, enriched with $^{176}$Yb) to yield the product substance (e.g., $^{177}$Lu), the mixture may be sublimated to remove most of the source substance and concentrate the target material, e.g., by heating the lower part of the lower crucible while cooling the upper part of the ampule, to condense the sublimating source structure on the receiving crucible. Consecutively, the concentrated product substance may be purified, while the solidified source structure may be reused.

2 Claims, 4 Drawing Sheets

(56) References Cited

U.S. PATENT DOCUMENTS

| | | | | |
|---|---|---|---|---|
| 2016/0040267 | A1* | 2/2016 | Stoner | G21G 1/12<br>204/157.21 |
| 2023/0111918 | A1* | 4/2023 | Oelsner | G21G 4/08<br>600/3 |
| 2023/0227942 | A1* | 7/2023 | Sisson | C22B 9/02<br>75/416 |

FOREIGN PATENT DOCUMENTS

| | | |
|---|---|---|
| WO | WO 2021/102167 | 5/2021 |
| WO | WO 2021/202914 | 10/2021 |

* cited by examiner

SEPARATION OF RARE EARTH ELEMENTS BY MEANS OF PHYSICAL CHEMISTRY FOR USE IN MEDICAL APPLICATIONS

BACKGROUND OF THE INVENTION

1. Technical Field

The present invention relates to the field of methods of physical chemistry for substances separation, and more particularly, to systems and methods for separating lutetium (Lu) and ytterbium (Yb).

2. Discussion of Related Art

The following patents and patent applications are incorporated herein by reference in their entirety:

1. Gschneidner 1965 (The application of vacuum metallurgy in the purification of rare-earth metals. OSTI Technical report, Ames Lab., Iowa State Univ. of Science and Tech., From Vacuum Metallurgy Conference. New York.) teaches vacuum melting and distillation separation processes for rare-earth metals and provides various reduction and purification techniques.
2. Russian Patent No. 2704005 teaches a method for producing a lutetium-177 radionuclide without a carrier, by irradiating metal ytterbium as the target substance in a stream of thermal neutrons at the reactor. Separation of target substance is carried out by its evaporation into ballast volume in high vacuum at temperature of 700-800° C., to leave the radionuclide lutetium-177 as the product of the reaction (Yb-176 (n,γ)→Yb-177→Lu-177) on the inner surface of the container, and washing it with a solution of hydrochloric or nitric acid.
3. WIPO Publication No. 2019106182 teaches compounds of the following formula for chromatographic separation of rare earth elements and/or s-, p-, d-metals:

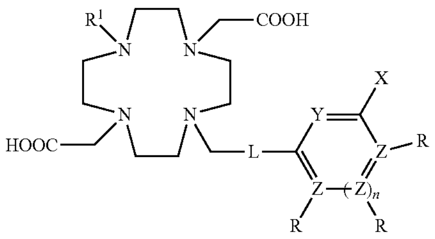

4. WIPO Publication Nos. WO2021102167 and WO2021202914 teach methods for purifying lutetium by providing a solid composition comprising ytterbium and lutetium and subliming or distilling ytterbium from the solid composition at a temperature of about 1196° C. to about 3000° C. to leave a lutetium composition comprising a higher weight percentage of lutetium than was present in the solid composition.

As discussed below, disclosed embodiments are advantageous with respect to the prior art in various aspects such as yield, safety, efficiency of collection of $^{177}$Lu and/or purity and/or concentration of the product.

SUMMARY OF THE INVENTION

The following is a simplified summary providing an initial understanding of the invention. The summary does not necessarily identify key elements nor limit the scope of the invention, but merely serves as an introduction to the following description.

One aspect of the present invention provides a cyclical $^{177}$Lu generation and separation method comprising: setting a first crucible with $^{171}$Yb coaxially opposite and in fluid communication with a second crucible, with both crucibles set within a tube and both crucibles and the tube being transparent to neutrons, heating and generating a vacuum in the tube, and consecutively sealing the tube, irradiating the $^{176}$Yb in the first crucible in the sealed tube with neutrons to generate $^{176}$Yb enriched with $^{177}$Lu therein, subliming $^{176}$Yb from the first crucible onto the second crucible to concentrate the $^{177}$Lu in the first crucible, within the sealed tube, breaching the tube sealing, separating the first crucible with the concentrated $^{177}$Lu from the second crucible with the sublimed $^{176}$Yb, repeating said setting, heating, irradiating, subliming and breaching for a plurality of cycles, using the second crucible with the sublimed $^{176}$Yb from each cycle to prepare the first crucible with $^{176}$Yb for the next cycle, and post-processing the concentrated $^{177}$Lu from the plurality of cycles to yield purified $^{177}$Lu.

One aspect of the present invention provides a cyclical enrichment method comprising: setting a first crucible with a source material coaxially opposite and in fluid communication with a second crucible, with both crucibles set within a tube and both crucibles and the tube being transparent to neutrons, heating and generating a vacuum in the tube, and consecutively sealing the tube, irradiating the source material in the first crucible in the sealed tube with neutrons to enrich the source material with a product material therein, subliming source material from the first crucible onto the second crucible to concentrate the product material in the first crucible, within the sealed tube, breaching the tube sealing, separating the first crucible with the concentrated product material from the second crucible with the sublimed source material, repeating said setting, heating, irradiating, subliming and breaching a plurality of cycles, using the second crucible with the sublimed source material from each cycle to prepare the first crucible with the source material for the next cycle, and post-processing the concentrated product material from the plurality of cycles to yield purified product material.

One aspect of the present invention provides an enrichment system comprising: a sealing unit configured to heat and generate a vacuum in a tube and consecutively seal the tube, wherein the tube includes a first crucible with a source material coaxially opposite and in fluid communication with a second crucible, with both crucibles set within the tube and both crucibles and the tube being transparent to neutrons, an irradiation unit configured to irradiate the source material in the first crucible in the sealed tube with neutrons to enrich the source material with a product material therein, a sublimation unit configured to sublime source material from the first crucible onto the second crucible to concentrate the product material in the first crucible, within the sealed tube, a handling unit configured to breach the tube sealing, separate the first crucible with the concentrated product material from the second crucible with the sublimed source material, and to use the second crucible with the sublimed source material as the first crucible with the source material for a consecutive enrichment cycle through the system, and a post-processing unit configured to yield purified product material from the concentrated product material from a plurality of enrichment cycles.

These, additional, and/or other aspects and/or advantages of the present invention are set forth in the detailed description which follows, possibly inferable from the detailed description, and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout. In the accompanying drawings.

Figure 1:
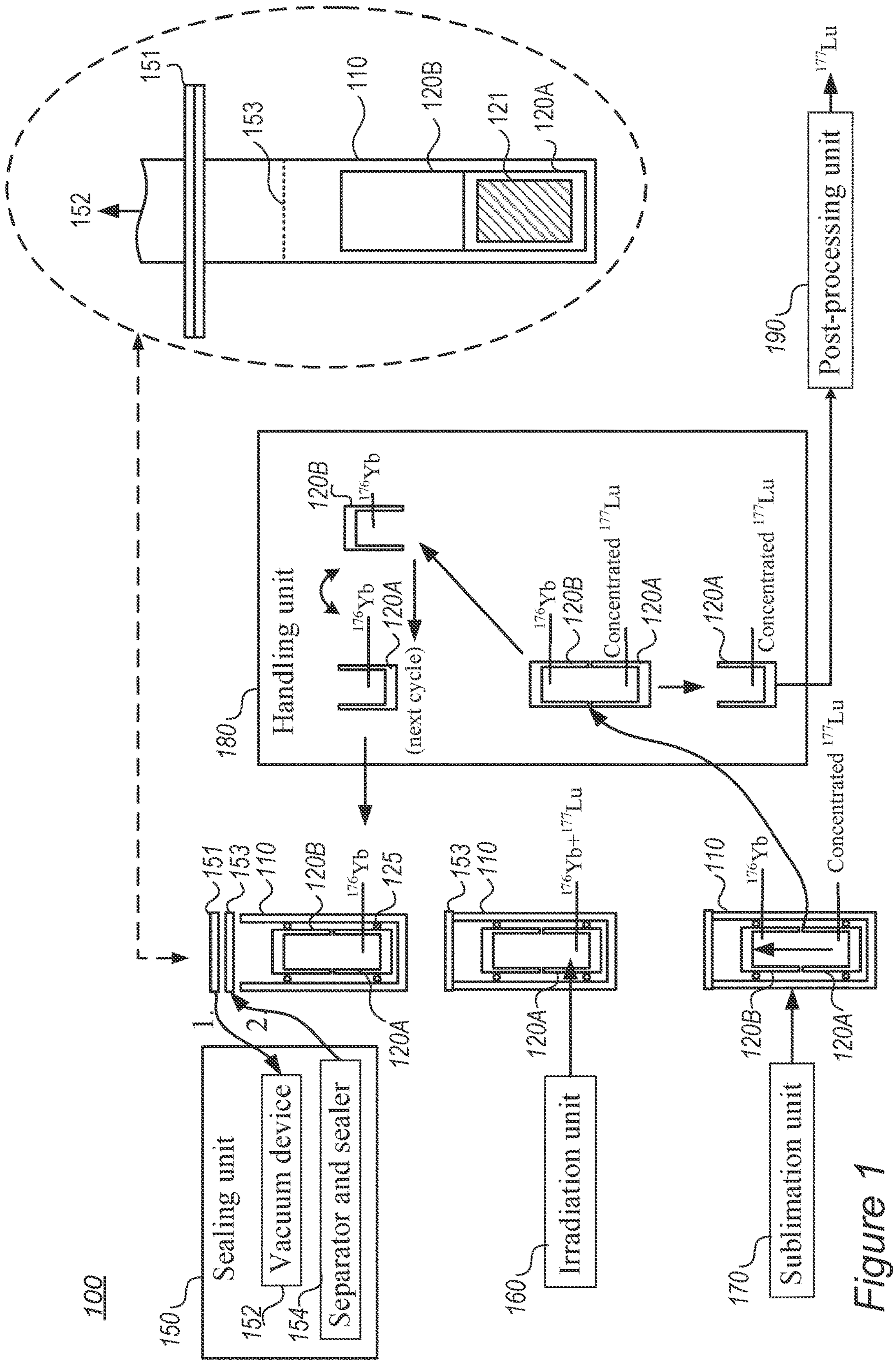
FIG. 1 is a high-level schematic block diagram of enrichment systems in operation, according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention may be practiced without the specific details presented herein. Furthermore, well known features may have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein are for the purpose of description and should not be regarded as limiting.

Some embodiments of the present invention provide efficient and economical methods and mechanisms for generating and separating materials, and thereby provide improvements to the technological field of material separation and especially of generation of radionuclides. Methods and systems are provided for cyclical enrichment, especially of rare earth elements and isotopes. A tube, or ampule, with two coaxially opposite crucibles in fluid communication, is used to hold a source material in vacuum and irradiate the source material to enrich it with product material. Following the irradiation of the source substance (e.g., metallic Yb, enriched with $^{176}$Yb) to yield the product substance (e.g., $^{177}$Lu), the mixture may be sublimated to remove most of the source substance, e.g., by heating the lower part of the lower crucible while cooling the upper part of the ampule, to condense the sublimating source structure on the receiving crucible. Consecutively, the concentrated product substance may be purified, while the solidified source substance may be reused.

Figure 2:
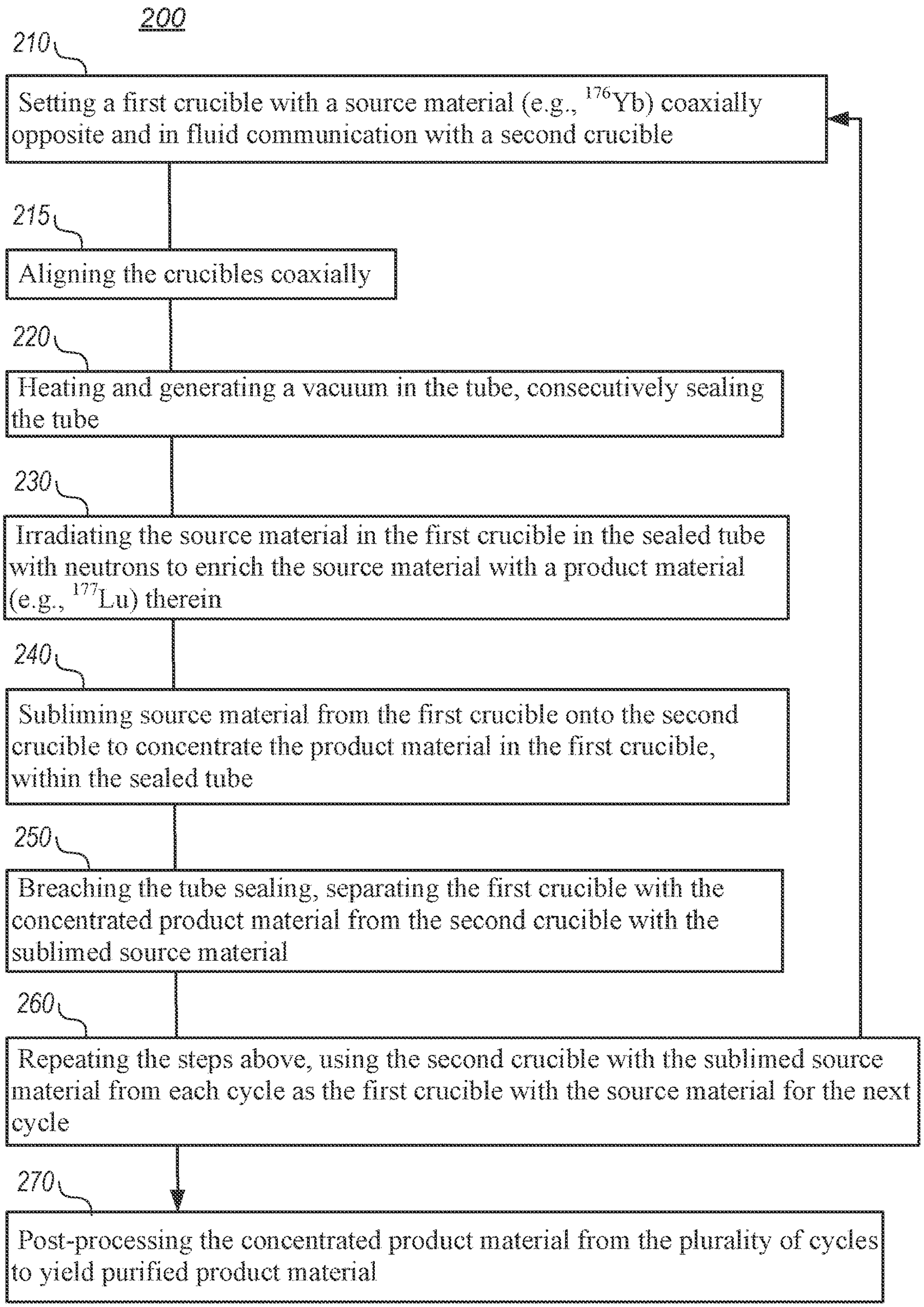
FIG. 2 is a high-level flowchart illustrating cyclical enrichment methods, according to some embodiments of the invention.
Figure 3:
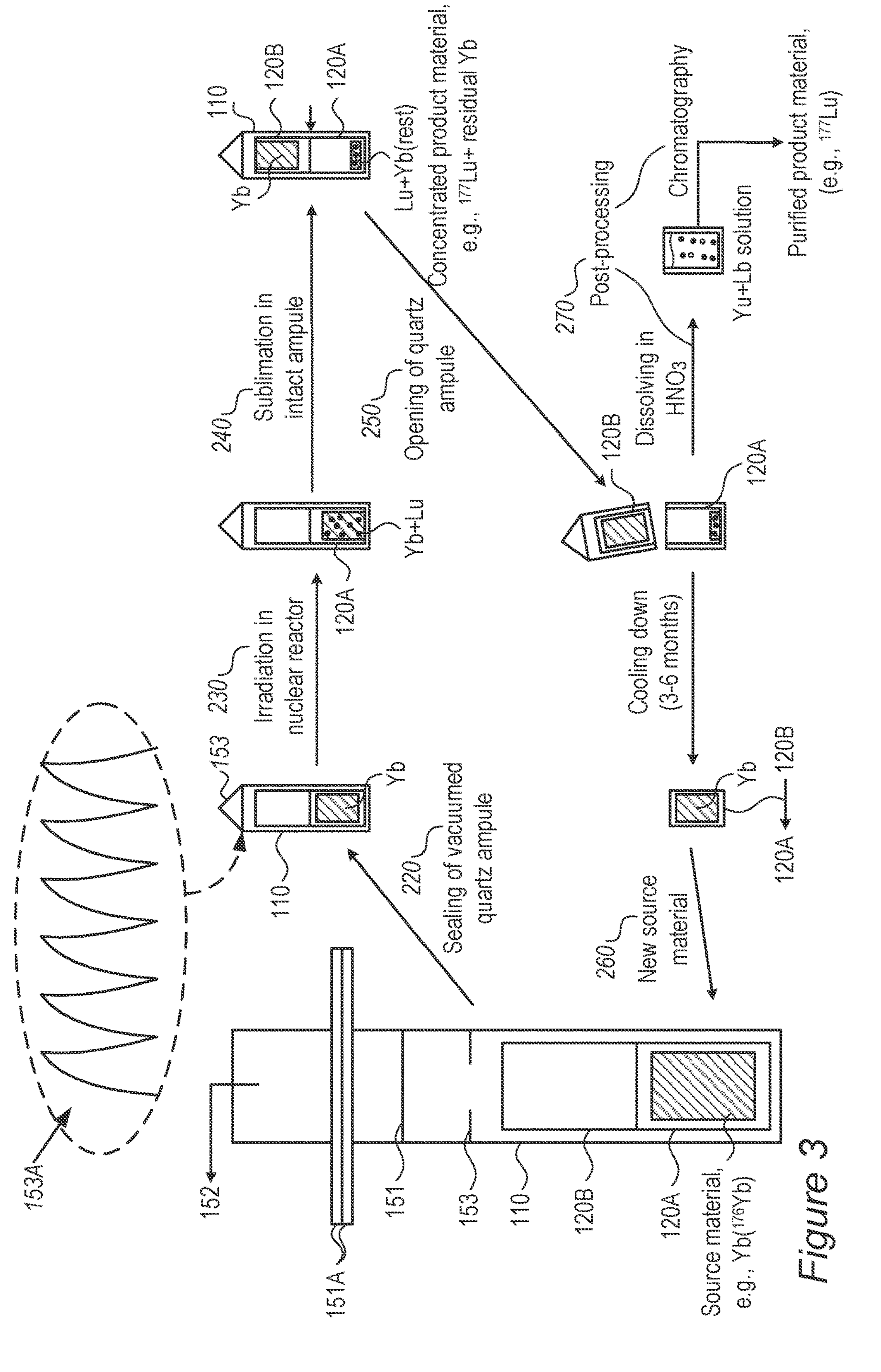
FIG. 3 is a high-level schematic non-limiting example of the operation of enrichment systems for cyclical $^{177}$Lu generation and separation, according to some embodiments of the invention.

FIG. 1 is a high-level schematic block diagram of an enrichment system 100 in operation, according to some embodiments of the invention. FIG. 2 is a high-level flowchart illustrating cyclical enrichment method 200, according to some embodiments of the invention. The method stages may be carried out with respect to system 100 described above, which may optionally be configured to implement method 200. In some embodiments, method 200 may comprise cyclically generating and separating $^{177}$Lu from $^{176}$Yb, and FIG. 3 is a high-level schematic non-limiting example of the operation of enrichment system 100 for cyclical $^{177}$Lu generation and separation, according to some embodiments of the invention. However, disclosed systems 100 and methods 200 may be applied to separate other elements and/or isotopes, as disclosed herein. Elements from FIGS. 1-3 may be combined in any operable combination, and the illustration of certain elements in certain figures and not in others merely serves an explanatory purpose and is non-limiting.

Enrichment system 100 may comprise a sealing unit 150 configured to heat and generate a vacuum in a tube 110 (e.g., a quartz ampule in FIG. 3) and consecutively seal tube 110, which includes a first crucible 120A with a source material coaxially opposite and in fluid communication (face to face, with openings that allow material flow between the crucibles) with a second crucible 120B, with both crucibles 120A, 120B set within tube 110 and both crucibles 120A, 120B and tube 110 being transparent to neutrons, as illustrated schematically in the inset illustration in FIG. 1. Crucibles 120A and 120B may be sealably attached to each other (but are illustrated in FIG. 1 as being slightly separate, merely for clarity purposes) and are coaxially aligned, possibly by an alignment device 125 (illustrated in a highly schematic manner).

Correspondingly, method 200 may comprise setting a first crucible with a source material coaxially opposite and in fluid communication with a second crucible, with both crucibles set within a tube and both crucibles and the tube being transparent to neutrons (stage 210) and optionally aligning the crucibles coaxially (stage 215). Method 200 may further comprise heating and generating a vacuum in the tube, and consecutively sealing the tube (stage 220). For example, the source material may comprise $^{176}$Yb (e.g., with a $^{174}Yb$ fraction of less than 1%) and method 200 may comprise cyclically generating and separating $^{177}Lu$, as disclosed herein.

Crucibles 120A and 120B may be made of refractory material for high-temperature processing. For example, crucibles 120A and 120B may be made of niobium and/or niobium alloys further comprising in total up to 50% in mass of at least one of: zirconium, tungsten, tantalum, titanium, nickel, their combinations and/or alloys. Crucibles 120A and 120B may have a length between 10 mm and 50 mm (e.g., any of 10 mm, 20 mm, 25 mm, 30 mm, 40 mm, 50 mm or intermediate values), a diameter between 4 mm and 30 mm (e.g., any of 4 mm, 6 mm, 8 mm, 10 mm, 15 mm, 20 mm, 30 mm or intermediate values) and a thickness of up to 2 mm. Crucibles 120A and 120B may be made with a ratio between the inner crucible width to the crucible wall thickness ranging between 1:1 to 20:1, preferably 5:1, to provide heat transfer perpendicular to the axis of the target.

Alignment device 125 may be installed between crucibles 120A and 120B, and may comprise one or more inner and/or outer ring(s), or any other parts configured to ensure strict coaxial orientation of crucibles 120A and 120B with respect to each other during the sealing, irradiation and sublimation processes. The gap between crucibles 120A and 120B may be minimal or none. The fit of crucibles 120A and 120B inside tube 110 may be configured to prevent damage upon thermal changes in crucibles 120A and 120B during the processes, e.g., not be completely tight, to prevent damage to tube 110, e.g., due to the thermal expansion of crucibles 120A and 120B or other mechanical or thermal strains applied during the process.

Tube 110 may be made of quartz and be configured to be attachable to a vacuum device 152 and then to be sealed upon separation from vacuum device 152, maintaining an internal vacuum. For example, tube 110 may be welded or otherwise sealed at one end and welded or glued with a quartz tube of vacuum device 152 at its opposite end (indicated schematically as vacuum connection 151, which may, e.g., comprise a flange junction 151A (see FIG. 3, with or without an additional seal 151) containing a quartz tube designed to connect to the unwelded end of quartz tube 110 using a clamping sealing device, using glue or implementing other connection means.

For example, tube 110 may be heated, e.g., to between 300° C. and 600° C. to desorb gases from the surface of the components, and vacuum may be applied to reach a residual pressure in the tube up to $10^{-7}$ hPa.

Following the generation of vacuum in tube 110, tube 110 may be sealed and separated from vacuum device 152, seal 153 illustrated in a highly schematic manner. For example, tube 110 may be welded or glued, e.g., under static vacuum (e.g., under pressure up to $10^{-7}$hPa) and by welding in a hydrogen flame using a non-injector single-flame burner, or by other means, such as by an acetylene torch or by laser welding. During the welding for sealing, tube 110 may be consistently heated to a temperature not lower than 1100° C. (e.g., when tube 110 is made of quartz, 1100° C. being close to the melting point of quartz), e.g., under constant rotation of the burner tip around tube 110. The burner may be positioned in such a way that the flame enters preferably at an angle of 90° to the wall of tube 110, yielding, in non-limiting examples, a triangular seal 153 as illustrated schematically in FIG. 3, e.g., by moving the burner tip around tube 110 along a zigzag trajectory (up and down the tip of tube 110, illustrated schematically and indicated by numeral 153A) to ensure the consistent heating. After the formation of a narrowing on tube 110 (e.g., illustrated triangular seal 153 of the quartz ampoule), the intensity of the flame may be increased with simultaneous stretching of the lower part of tube 110. Flame power control may be performed both in manual and automatic mode. The vacuum tightness of tube 110 may be verified by immersing the sealed ampoule in a container with water and rejecting the ampoule if traces of water are found inside. Tube 110 with ytterbium may additionally be placed in a container made of aluminum, steel or zirconium alloys to ensure mechanical strength.

Enrichment system 100 may further comprise an irradiation unit 160 configured to irradiate the source material (e.g., metallic Yb, enriched with $^{176}Yb$) in first crucible 120A within sealed tube 110 with neutrons to enrich the source material with a product material (e.g., $^{177}Lu$) therein. Correspondingly, method 200 may comprise irradiating the source material in the first crucible in the sealed tube with neutrons to enrich the source material with a product material therein (stage 230), for example, irradiating the $^{176}Yb$ in the first crucible in the sealed tube with neutrons to generate $^{176}Yb$ enriched with $^{177}Lu$ therein.

Figure 4A:
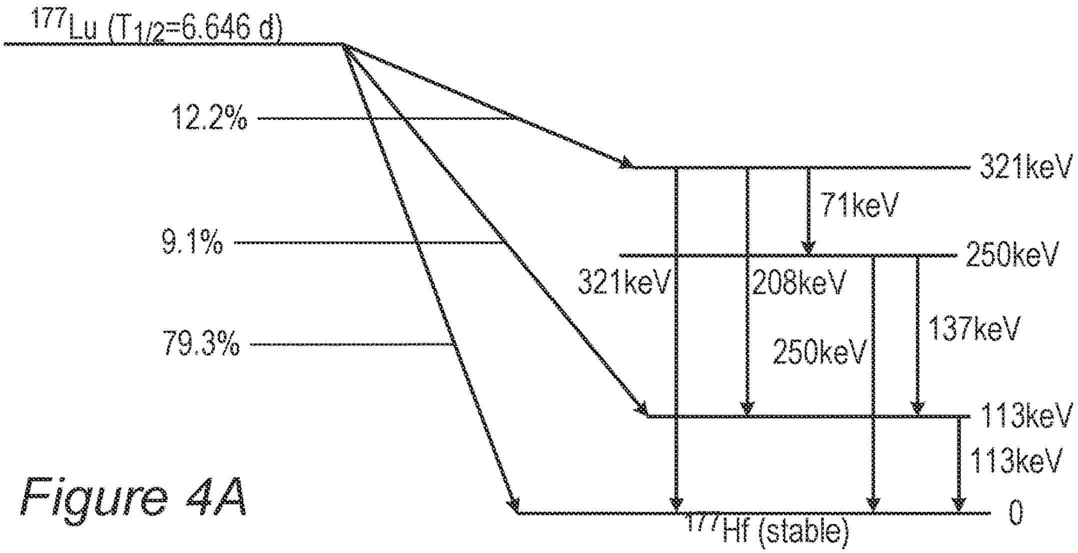
FIGS. 4A-4C provide background information, including the decay scheme of the radionuclide $^{177}$Lu illustrated schematically in FIG. 4A, the dependence of the yield of $^{177}$Lu on the irradiation time of $^{176}$Yb for different values of the neutron flux density illustrated schematically in FIG. 4B, and the specific activity of $^{177}$Lu as a function of the duration of irradiation and post-reactor storage/processing at different % contents of $^{174}$Yb in the starting isotope mixture illustrated schematically in FIG. 4C.
Figure 4B:
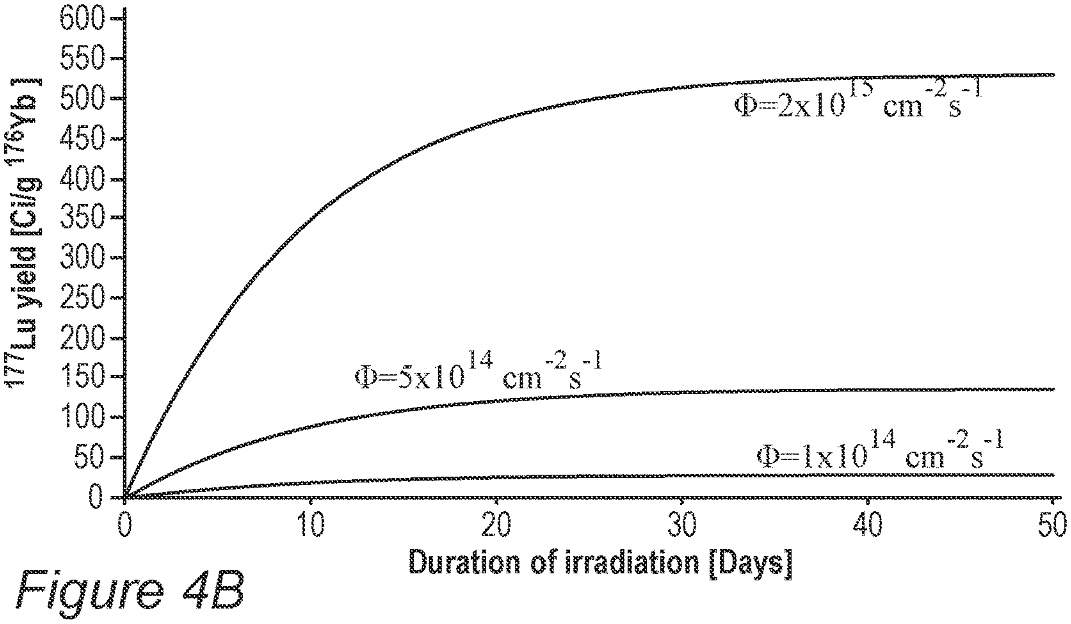
Figure 4C:
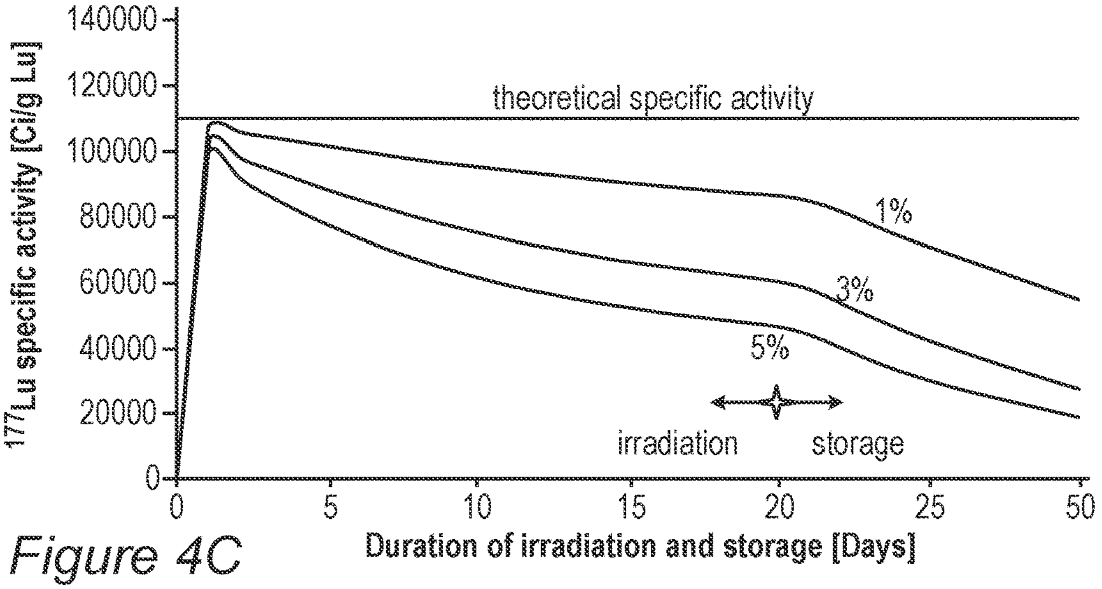

For the non-limiting examples of generating $^{177}Lu$ from irradiating $^{176}Yb$ disclosed herein, FIGS. 4A-4C provide background information, including the decay scheme of the radionuclide $^{177}Lu$ illustrated schematically in FIG. 4A, the dependence of the yield of $^{177}Lu$ on the irradiation time of $^{176}Yb$ for different values of the neutron flux density illustrated schematically in FIG. 4B, and the specific activity of $^{177}Lu$ as a function of the duration of irradiation and post-reactor storage/processing at different % contents of $^{174}Yb$ in the starting isotope mixture illustrated schematically in FIG. 4C. Further discussion concerning these properties is provided below.

Irradiation unit 160 may comprise core of a nuclear reactor as a neutron source for neutron irradiation. The irradiation time may be determined with respect to the desired activity of $^{177}Lu$ and to parameters of the specific reactor (neutron flux on the target).

Enrichment system 100 may further comprise a sublimation unit 170 configured to sublime (turning from solid into gas and back) source material (e.g., metallic Yb, enriched with $^{176}Yb$) from first crucible 120A onto second crucible 120B (in which it may condense turning from gas into solid) to concentrate the product material (e.g., $^{177}Lu$) in first crucible 120A, within sealed tube 110. Correspondingly, method 200 may comprise subliming source material from the first crucible onto the second crucible to concentrate the product material in the first crucible, within the sealed tube (stage 240), for example, subliming $^{176}Yb$ from the first crucible onto the second crucible to concentrate $^{177}Lu$ in the first crucible, within the sealed tube.

For example, the subliming may be carried out by heating first crucible 120A and condensing the sublimed Yb onto a bottom of second crucible 120B, opposing an opening thereof. Heating of first crucible 120A may be carried out to temperatures between 400° C. and 1000° C. (e.g., any of 400° C., 500° C., 600° C., 700° C., 800° C., 900° C., 1000° C., or any intermediate values) and a temperature of second crucible 120B may be kept between 20° C. and 300° C. (e.g., any of 20° C., 40° C., 50° C., 70° C., 100° C., 200° C., 300° C., or any intermediate values), and the subliming may be carried out between 10 minutes and 10 hours (e.g., any of 10, 30, 60 minutes, 2, 4, 6, 10 hours, or any intermediate values). In various embodiments, heating may be carried out gradually and/or any of the disclosed temperatures may be modified during the process to optimize the resulting yields and/or other parameters of the process.

The difference in temperatures of crucibles 120A and 120B may be achieved by heating the former and cooling the latter, and/or by using a partition for achieving at least partial thermal separation of the top and bottom parts of tube 110, e.g., controlling different heat transfer in an oven and/or electromagnetic induction and/or radio frequency heating, by blowing air at one or more temperatures, providing heat shields and/or reflectors, etc.

In various embodiments, the sublimed $^{176}$Yb in second crucible 120B may include at least 97 wt %, 98 wt %, 99 wt %, 99.5 wt % or any intermediate or higher values, and the concentrated $^{177}$Lu in the first crucible includes at most 3 wt %, 2 wt %, 1 wt %, 0.5 wt %, or any intermediate or lower values of the $^{176}$Yb originally set in first crucible 120A. Accordingly, the ytterbium obtained in the sublimation process can be used to produce a new target without additional processing, and the lutetium content in the total mass in the lower crucible may reach 50% (1:1 Yb/Lu ratio), as a non-limiting example, which greatly facilitates the process of extraction and chromatographic post-treatment disclosed herein.

Enrichment system 100 may further comprise a handling unit 180 configured to breach tube sealing 153, separate first crucible 120A with concentrated product material (e.g., $^{177}$Lu) from second crucible 120B with the sublimed source material (e.g., metallic Yb, enriched with $^{176}$Yb), and use second crucible 120B with the sublimed source material as first crucible 120A with the source material for a consecutive enrichment cycle through system 100 (indicated schematically). Correspondingly, method 200 may comprise breaching the tube sealing, separating the first crucible with concentrated product material from the second crucible with the sublimed source material (stage 250), for example breaching the tube sealing, separating the first crucible with concentrated $^{177}$Lu from the second crucible with the sublimed Yb, and repeating the method stages 210-250 (setting 210, heating 220, irradiating 230, subliming 240 and breaching 250) for multiple cycles, using the second crucible with the sublimed source material from each cycles as the first crucible with the source material for the next cycle, material (stage 260), for example repeating the method stages 210-250 for a plurality of cycles, using the second crucible with the sublimed Yb from each cycle to prepare the first crucible with Yb for the next cycle (see the schematic illustration in FIG. 1, at the top of the illustration of handling unit 180).

As typically less than 1 wt % of the source material is turned into product material, the remaining source material (after sublimation from first crucible 120A and solidification onto second crucible 120B) may be used as the source material in the next cycle of the process, possibly without additional processing. Second crucible 120B with the condensed source material may be removed from tube 110 and used as first crucible 120A in new tube 110 used in the consecutive cycle of disclosed systems 100 and methods 200, repeating the entire process of vacuum-tight connecting the ampule with the quartz tube of the vacuum system described above (stage 210, 215, 220), etc. This is an important advantage of the disclosed method of target processing—the absence of additional stages of moving expensive isotope-enriched ytterbium, which could lead to losses or contamination of the material.

Enrichment system 100 may further comprise a post-processing unit 190 configured yield purified product material (e.g., $^{177}$Lu) from the concentrated product material from a plurality of enrichment cycles. Correspondingly, method 200 may comprise post-processing the concentrated product material from the plurality of iterations to yield purified product material (stage 270), e.g., post-processing the concentrated $^{177}$Lu from the plurality of cycles to yield purified $^{177}$Lu.

Post-processing may be used to remove impurities of non-volatile ytterbium compounds, for example, the post-processing may comprise dissolution of the concentrated $^{177}$Lu (with remaining $^{176}$Yb) in first crucible 120A in hydrochloric and/or nitric acids (or combinations or mixtures thereof), and chromatographic purification. Additionally or complementarily, organophosphoric acids may be used, in particular, di-(2-ethylhexyl)-orthophosphoric acid (DEHPA or HDEHP) (structural formula 1), 2-ethylhexyl-2-ethylhexylphosphonic acid (HEH[EHP]) (structural formula 2), e.g., available under the brand names LN resin and LN2 resin (Triskem©), possibly after separation in hydrochloric acid solutions and/or extraction chromatography in an insoluble hydrophilic aliphatic polymer (e.g., acrylic ether).

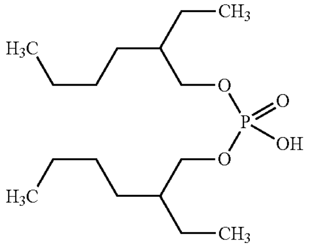

(1)

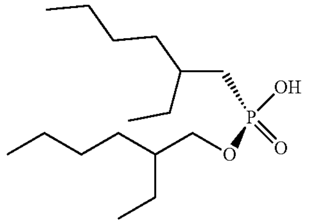

(2)

In certain embodiments, post-processing may be implemented as a multi-stage separation and purification (e.g., due to the significant difference in the amount of ytterbium and lutetium). In a non-limiting example, post-processing may be carried out in at least three stages of separation: (i) separation of macro quantities of ytterbium, (ii) primary isolation of $^{177}$Lu, and (iii) secondary (final) purification of the product. At all three stages, separation may be carried out on LN2 resin. At interstage transitions involving the desorption of lutetium (with ytterbium) from the column from the previous stage and its sorption on the column of the subsequent stage, the acidity differs significantly. The simplest way to remove the acid is to evaporate the solution. However, this is a long and time-consuming operation, which can be replaced by sorption, using TODGA (or DGA) resin as a sorbent. This resin contains tetraoctyldiglycolamide (structural formula 3), capable of REE sorption from strongly acidic solutions and weakly retains REE in dilute acid solutions.

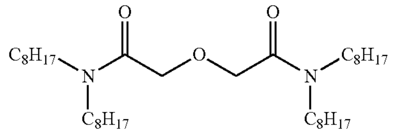

(3)

In a non-limiting experimental setting, the yield of $^{177}Lu$ in this process reached 73%, and the total purification coefficient from ytterbium exceeded $10^6$, which is sufficient for the production of $^{177}Lu$ for pharmaceutical purposes. The total process time was about four hours, which is also a good indicator. In the case of using a combination of two stages: sublimation and chromatography, the extraction of lutetium-177 can be up to 90%, and the mass of processed ytterbium targets can be increased up to several grams.

In various embodiments, the yield of the post-processing may be above 50%, 60%, 70%, 80% or intermediate values (for extracting the product material such as lutetium-177 from the concentrated product material), and a total purification coefficient of method 200 may be at least a million ($10^6$)—increasing the concentration of the product material such as lutetium-177 in the final product with respect to the initial material.

In certain embodiments, systems 100 and/or method 200 may be applied to metals and/or isotopes that have very different boiling points, e.g., to source material and product material that have boiling points that differ (in ° K) by at least 10%, 20%, 30%, 40%, 50%, intermediate values or more. In non-limiting examples, the source material may be zinc and the product material may be copper, or the source material may be europium and the product material may be terbium.

Advantageously, certain embodiments provide efficient production of lutetium-177 ($^{177}Lu$), which is one of the most promising radionuclides for cancer therapy due to its unique radiochemical properties and the possibility of chemical bonding with organic molecules. Disclosed embodiments overcome various prior art difficulties in the production of this isotope. $^{177}Lu$ is a radioactive isotope with a half-life $T_{1/2}$=6.646 days, decaying with the emission of medium-energy beta and gamma radiation, as illustrated schematically in FIG. 4A. $^{177}Lu$ is obtained by irradiation with reactor neutrons of the starting material, which can be used as an isotope of lutetium-176 ($^{176}Lu$) or ytterbium-176 ($^{176}Yb$), however, of much greater practical interest is the production of lutetium-177 by irradiation of ytterbium-176. In the absence of other competing processes, irradiation of $^{176}Yb$ leads to the formation of only one isotope of lutetium —$^{177}Lu$. Therefore, this method allows to obtain a product with a specific activity corresponding to the theoretical value. i.e., 110 kCi/g. The dependence of the yield of $^{177}Lu$ (Ci per gram of the starting $^{176}Yb$) for neutron fluxes of different densities is shown in FIG. 4B. The dependencies do not have pronounced maxima in practically significant ranges of the irradiation cycle duration. This means that it is possible to choose the irradiation duration or the starting radionuclide mass in accordance with a given performance. Even in a high-flux reactor, there is a very low burnup of the starting material. The relatively short half-life of the intermediate product of $^{177}Lu$ accumulation—$^{177}Yb$ ($T_{1/2}$=1.91 hours) allows the reuse of the starting material after exposure for the decay of this radionuclide in a few days. However, the actual activity of the irradiated material (hence the duration of the required exposure) is determined by the decay of other impurity isotopes. In any case, multiple use of the starting material is possible, which is extremely important given the high price of the starting isotope-enriched material.

An equally important aspect is the isotopic composition of the starting material. The calculations of the yield and specific activity of $^{177}Lu$ presented above were carried out based on the assumption of 100% content of $^{176}Yb$ in the starting material. In practice however, ytterbium-176 oxide supplied by the enrichment facilities can have up to 2-3% of the isotope $^{174}Yb$. The presence of the $^{174}Yb$ isotope in the starting composition leads to the accumulation of $^{175}Yb$ ($T_{1/2}$=4.18 d), which decays into $^{175}Lu$ after the end of irradiation and thus reduces the specific activity of $^{177}Lu$ accumulated during irradiation. The effect of the insufficiently high enrichment of the starting material is shown in FIG. 4C. Calculations of the specific activity of $^{177}Lu$ are given for a model irradiation schedule in the SM-3 reactor (Research Institute of Atomic Reactors, Dimitrovgrad, Russia), taking into account the actual duration of the reactor cycle and the time of operations to extract irradiated targets from the reactor and delivering these to the processing site and the actual radiochemical processing. When the content of $^{174}Yb$ is more than 1%, the specific activity of $^{177}Lu$ during irradiation and subsequent post-reactor operations changes dramatically and decreases to the value of the specific activity of $^{177}Lu$ produced by the "direct" method (irradiation of isotope-enriched $^{176}Lu$). In other words, the presence of $^{174}Yb$ isotope impurities in the starting material may lead in the prior art to the production of a substandard product. This leads to the need to use the starting material with the highest possible degree of enrichment, which, however, currently does not pose a big problem, since material with a $^{174}Yb$ fraction of less than 0.2% is commercially available. It is also worth noting that with repeated use (recycling) of the starting material, the content of $^{174}Yb$ in it decreases due to burnout, e.g., each successive irradiation cycle improves the quality of the starting material.

Depending on the irradiation conditions, the amount of $^{177}Lu$ produced in the target varies from 0.05 to 0.3% (by weight). Assuming that the amount of ytterbium in the final product should not exceed 5% of the mass of lutetium (otherwise, the yield of the usable fraction during the synthesis of labeled compounds will decrease proportionally), then the separation factor of these two elements should be at least $n \cdot 10^6$. Since the structure of the electronic shells of ytterbium and lutetium are extremely similar (the configuration of the outer electronic shell $4f^{14}6s^2$ and $4f^{14}5d^1 6s^2$, respectively), the separation of these two elements is an extremely difficult chemical task, since their chemical properties are very similar.

When separating ytterbium and lutetium in the oxidation state +3, the separation is usually characterized by a low separation factor (coefficient). This leads to the need for multiple repetition of separation acts, in particular—due to the chromatographic design of the process. This approach is used for separation by extraction methods (extraction chromatography) or ion exchange (ion exchange chromatography).

The boiling point of metallic lutetium and metallic ytterbium is 3395° C. and 1196° C., respectively. This feature can be used to separate lutetium and ytterbium. At high temperatures (more than 400° C.), the saturated vapor pressure of elementary metallic ytterbium significantly exceeds the saturated vapor pressure of elementary lutetium, which fundamentally allows their separation, but this method has not yet become widespread due to the technical complexity of remote handling of radioactive substances in radiation-protective chambers. Separation must be carried out under vacuum conditions at temperatures above 400° C. and the materials of the device must be inert to ytterbium vapor.

Advantageously, with respect to prior art such as WIPO Publication No. 2021102167 that uses a movable cold finger to collect Yb vapor, disclosed embodiments overcome prior art disadvantages such as (i) requiring a large volume of the reaction apparatus, leading to a large amount of residual gas that can both form non-volatile compounds with ytterbium metal and interfere with the evaporation of the metal, (ii) lack of an obvious simple way to collect and return of ytterbium collected on a cold finger to the subliming cycle, and (iii) due to the small surface of the cold finger on which ytterbium vapor condense, some of the vapor may turn out to be in a finely dispersed form, which is pyrophoric and can explode upon contact with air.

Advantageously, disclosed embodiments increase the useful yield of lutetium-177 radionuclides (increase the extraction of radionuclide from the product material) by implementing direct (with no intermediate steps) and highly efficient (yield of over 90% by mass) recovery of the enriched ytterbium material of the processed target. Disclosed embodiments enable separation of other metals and/or isotopes having very different boiling points, for example zinc and copper, europium and terbium.

In the above description, an embodiment is an example or implementation of the invention. The various appearances of "one embodiment", "an embodiment", "certain embodiments" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment. Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A system for converting $^{176}$Yb into $^{177}$Lu, the system comprising:

a sealed tube under vacuum;

a first crucible comprising a first open end and having a $^{176}$Yb source material contained therein positioned within the sealed tube;

a second crucible comprising a second open end positioned within the sealed tube, the second crucible coaxially aligned with and in fluid communication with the first crucible and positioned with the second open end opposing the first open end of the first crucible; and an irradiation unit configured to irradiate the $^{176}$Yb source material in the sealed tube with neutrons to produce a $^{177}$Lu product material, wherein the tube and both crucibles are made of material transparent to neutrons.

2. The system of claim 1, wherein:

the crucibles are made of niobium and/or niobium alloys further comprising in total up to 50% in mass of at least one of: zirconium, tungsten, tantalum, titanium, nickel, their combinations and/or alloys, the crucibles have a length between 10 and 50 mm, a diameter between 4 and 30 mm and a thickness of up to 2 mm, and the tube is made of quartz.

* * * * *